United States Patent
Suermondt et al.

(10) Patent No.: US 6,947,936 B1
(45) Date of Patent: Sep. 20, 2005

(54) METHOD FOR A TOPIC HIERARCHY CLASSIFICATION SYSTEM

(75) Inventors: Henri Jacques Suermondt, Sunnyvale, CA (US); George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 09/846,069

(22) Filed: Apr. 30, 2001

(51) Int. Cl.[7] .............................................. G06F 17/30
(52) U.S. Cl. ...................... 707/7; 707/2; 707/3; 707/8; 707/10; 707/100; 707/200; 715/12; 715/512
(58) Field of Search .............................. 707/1–10, 100, 707/101, 103 R, 104.1, 200, 202, 102, 104; 715/12, 512; 706/47, 16, 12

(56) References Cited

U.S. PATENT DOCUMENTS

| | | | | |
|---|---|---|---|---|
| 5,544,360 A | * | 8/1996 | Lewak et al. ................ | 707/1 |
| 5,737,739 A | * | 4/1998 | Shirley et al. ............. | 715/512 |
| 5,899,995 A | * | 5/1999 | Millier et al. ............. | 707/102 |
| 6,233,575 B1 | * | 5/2001 | Agrawal et al. ............ | 707/6 |
| 6,519,580 B1 | * | 2/2003 | Johnson et al. ............ | 706/47 |

OTHER PUBLICATIONS

Winnie Chen et al (hereinafter "Chen"), Quality evealuation of some combinatios of unit random number generators and unit normal transformation algorithms, 1981, IEEE Press, pp. 129–149.*

Stephen Busemann et al (hereinafter "Busemann"), Message classification in the call center, 2000, Morgan Kaufmann Publishers inc., pp. 158–165.*

* cited by examiner

Primary Examiner—Shahid Alam
Assistant Examiner—Fred Ehichioya

(57) ABSTRACT

A method and system is provided for categorization of an item. A plurality of categories is organized in a hierarchy of categories with a plurality of categorizers corresponding to the plurality of categories. A featurizer featurizes the item to create a list of item features. The list is used in a categorizer system, including the plurality of categorizers, for determining a plurality of levels of goodness. The item is categorized in the categorizer system in the plurality of categories based on the respective plurality of levels of goodness. The best categories are processed first, allowing termination at any time. The system successively refines an item down a hierarchy, until the features no longer support further refinement. The categories and the degree of support for the categories are provided.

34 Claims, 3 Drawing Sheets

METHOD FOR A TOPIC HIERARCHY CLASSIFICATION SYSTEM

TECHNICAL FIELD

The present invention relates generally to topic hierarchy systems and more particularly to a method of classification using a topic hierarchy system.

BACKGROUND ART

In the past, many different systems of organization have been developed for categorizing different types of items. The items have ranged from material items, such as different types screws to be placed into different bins, to knowledge items, such as books to be placed in order in the Dewey Decimal System. For ease of understanding, the categorization of items will be described as the categorization of documents although it will be understood that all types of material and knowledge items are included in the term documents.

The earliest systems used manual assignment of documents to categories, for example, by human experts. This is currently the dominant method, which is used in libraries, as well as by popular Internet search engine companies. Some companies have warehouses of people who do the categorization.

The primary disadvantage of manual assignment is the fact that it is labor-intensive; it requires human resources approximately proportional to the number of documents that need to be categorized. In addition, it is somewhat error-prone and may lead to inconsistencies if people are assigning documents to categories based on different criteria, different interpretations of criteria, or different levels of expertise.

To be less subjective, rule-based assignment of documents to categories, including rules based on keywords, has been developed for use with computer systems. This approach uses rules such as "if the document contains the words 'football', and 'goal', and 'umpire'" and not the word "national" then assign it to the category "local football".

Mostly, human domain experts author these rules, possibly with the aid of keyword identification tools (such as word counters), to encode their knowledge. These rules usually are comprised of Boolean combinations of keyword occurrences (possibly modified by counts such as "the term 'national' used at least 5 times" then assign to "national baseball"). These rules can be executed automatically, so this solution can be used to automatically assign documents to categories.

The disadvantages of rule-based assignment are that the accuracy of these rules is often very poor; depending on the authoring of the rules, either the same document is assigned to many categories, including many wrong ones, or to too few, in which case documents do not appear in the categories they should. Another disadvantage is that the rules are difficult to author and maintain, and the interaction of the rules (so-called "chaining") is difficult to understand (and debug), so that unexpected: assignments of documents to categories may occur. Also, this solution cannot take systematically take advantage of explicit statements about cost of mis-categorization. This method also has no way to give incrementally better categorizations.

Various straight multi-category categorization methods that ignore the topic tree or topic hierarchy have been developed. These methods take all the topics and sub-topics, and treat them as completely independent categories. A "flat" multi-category categorization algorithm, for example, Naïve Bayes or C4.5, is then applied to the flat multi-category problem.

The disadvantages of this solution are that it creates thousands of categories and it does not take advantage of the knowledge about dependencies among categories that is embedded in the topic hierarchy. Thus, it cannot take advantage of similarity in features among "close" categories while zooming in on the features needed to set those categories apart. Another disadvantage of this solution is that there is no version of this method that takes the structure of the hierarchy into account in weighing the cost of mis-categorization.

Another disadvantage of this solution is that it requires large amounts of training data (typically an amount directly proportional to the number of categories). Also, this solution does not compute incrementally more refined answers (allowing graceful degradation of performance if computation is interrupted, or allowing partial results to be shown along the way).

Another method is the level-by-level hill-climbing categorization (so-called "Pachinko machine" after the Japanese pinball machine). This method considers the topic hierarchy one level at a time. At each level, there is a categorizer that picks the category with the highest probability (or some alternative method of goodness) of fitting into a given category given the features of the document. Once the document is assigned to that category, there is a sub-categorizer that tries to assign the document to the sub-category of the category to which it has been assigned.

A disadvantage of this method is that it is a "hill-climbing" method—it makes a commitment to go down a branch in the topic hierarchy based on local optimality, and can easily get stuck in local optimal solutions that are not globally optimal. For example, it can go from football, to local football, and to local league when it should be in soccer.

A further disadvantage is that the level-by-level categorization does not address problems in which documents may legally be assigned to multiple categories or to categories internal to the hierarchy; nor does it take the structure of the hierarchy into account explicitly in weighing the cost of mis-categorization.

Another method is the level-by-level probabilistic categorization. It has been noted that a Naïve Bayes categorizer that works level by level and weights the categorization proposals of each subtree by its Naïve Bayesian probability estimate at the upper level is exactly the same mathematically as doing flat Naïve Bayes (the multi-category categorization) in situations where the exact same feature set is used at each categorization location.

Manual assignment and rule-based assignment cannot be fully automated and operated without requiring human authoring of rules.

Manual assignment and rule-based assignment cannot "learn"; i.e., self-teach when provided with training cases (documents for which known, correct, topics are available) or have the accuracy of the method improve with experience.

None of these methods can easily take into account the cost of mis-categorization, either measured or manually assigned, and none of these methods can take advantage of the hierarchical dependencies among such costs of mis-categorization.

Only manual and rule-based assignment can be used in topic hierarchies where documents may only be assigned to leaves or to ones in which they may also be assigned to interior categories, but these methods have other insurmountable limitations.

Only manual and rule-based assignment can be used in categorization problems where documents must be assigned to a single category as well as in ones in which any document may be assigned to one or more categories, but these methods have other insurmountable limitations.

None of these methods can incrementally target more promising solutions first (thus potentially eliminating unnecessary computation effort).

None of these methods allows a divide-and-conquer approach to categorization in topic hierarchy; that is, the global categorization problem cannot be split into multiple categorization sub-problems, with the advantage that each sub-problem can be solved in a more focused, specific manner and with more focused selection and use of document features, potentially leading to more accurate categorization.

These limitations appeared as an insurmountable categorization problem in the real world when dealing with a customer support operation where there were different documents that describe solutions to specific problems and an intuitive hierarchy of what category these problems should be in were known. There were printer problems, and computer problems, hardware problems and software problems. Then under hardware, the problem can be about huge mainframe computers or about small personal computers. And with the printers it could be about the laser jets or the small ink jet printers or the all-in-one FAX copier, and so on. There were about five million support documents and, most significantly, insufficient staff to categorize a full training set as required by previous methods.

Thus a solution to this problem is has been urgently required, has been long sought, and has equally long eluded those skilled in the art.

DISCLOSURE OF THE INVENTION

The present invention provides a method for categorization of an item in which a plurality of categories organized in a hierarchy of categories is provided. In addition, a list of features for the item is provided. In addition, information as to how various item features support each of the categories or sets of categories in the hierarchy is provided, or a training set of items with features and category assignments is provided. The categorization method processes the list of item features in combination with the support information and assigns the item to the best category or categories (or decides that no category is applicable to the item). This method may be fully automated and operated without requiring human authoring of rules.

The present invention further provides a system for categorization of an item in which a plurality of categories organized in a hierarchy of categories is provided. A featurizer is provided to create a list of item features. A knowledge base contains information as to how various item features support each of the categories or sets of categories in the hierarchy. A trainer can be used to derive the information in the knowledge base from example items and category assignments for these example items. A categorizer processes the list of item features in combination with the knowledge base and categorizes the item in the categorizer system. The items are then assigned to the best category or categories (or the categorizer can determine that the item does not fit any category in the hierarchy). This system can learn from training items and can have the accuracy of categorization improve with experience.

The present invention further provides a method that allows the assignment of documents both to the "leaves" (the categories with no branches) and to the interior categories of the topic hierarchy (although it is possible to specify that documents may be assigned only to leaves).

The present invention further provides a method that allows documents to be assigned to either a single category or to multiple categories (although it is possible to specify that documents may be assigned only to a single category). Furthermore, the method allows the determination that the document does not fit any category well enough.

The present invention further provides a method that allows the categorization problem to be treated as a collection of local sub-problems, corresponding to the interior categories of the topic tree, and to take advantage of locally optimal categorization features at these sub-problems while still deriving a globally optimal categorization.

The present invention further provides a method that allows a best-first search towards a solution that leads to incrementally better solutions (so that if terminated prematurely, for example, under limited resources, it will lead to the best partial solution possible under the circumstances).

The present invention further provides a method that allows the categorizer system to take advantage of user-specifiable preferences (settings, or costs) for various types of mis-categorization errors to approach a categorization that best suits the user's preferences and the problem's circumstances.

The present invention further provides a method that can be applied to assign documents to topic hierarchies.

The present invention further provides a method that can be used in a customer support setting to create a hierarchy of problem-solving documents. Such an assignment of documents in a topic hierarchy may make it easier for customers to solve problems without needing to talk to customer-support representatives.

The present invention further provides a method that may also be applied to index and categorize pages on the World Wide Web, to make it easier for potential customers to find possible services and/or information sources.

The present invention further provides a method that may be applied to descriptions of services, including e-services. The services are then assigned to a topic hierarchy using this method, which may make it easier for potential users of these services to select one that meets their needs.

The present invention further provides a method that applies to categorization of documents (such as text documents) as well as to categorization of other items based on possible features of those items.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
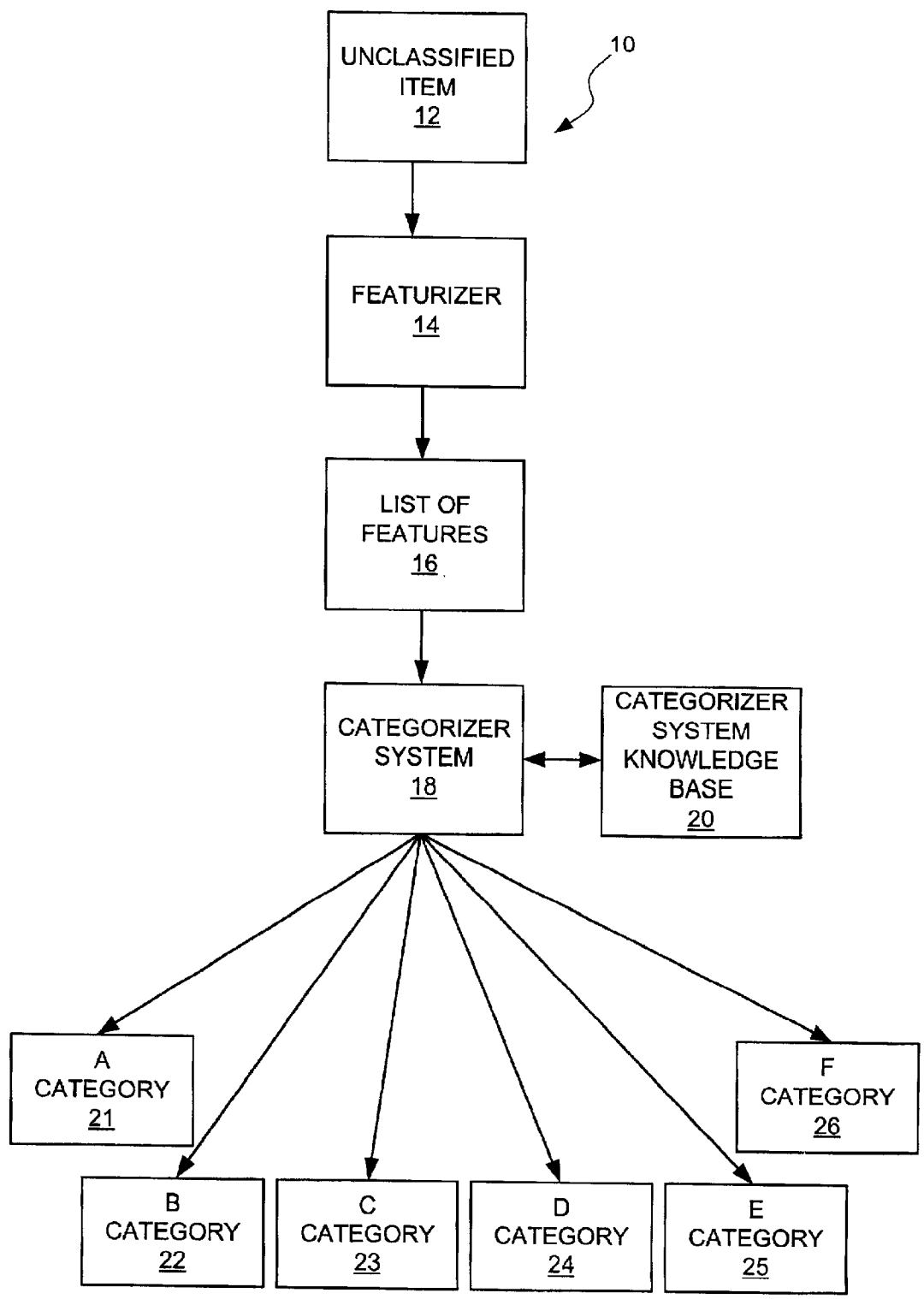
FIG. 1 is a block diagram of the categorization process of the present invention.

Referring now to FIG. 1, therein is shown a block diagram of a categorization process 10 of the present invention. The categorization process 10 starts with an unclassified item 12 which is to be classified, for example a raw document. The raw document is provided to a featurizer 14. The featurizer 14 extracts the features of the raw document, for example whether a word 1 was present and a word 2 was absent, or the word 1 occurred five times and the word 2 did not occur at all.

The features from the featurizer 14 are used to create a list of features 16. The list of features 16 is provided to a categorizer system 18 which uses knowledge from a categorizer system knowledge base 20 to select zero, one, or possibly more of the categories, such as an A category 21 through a F category 26 as the best category for the raw document. The letters A through F represent category labels for the documents. The process computes for the document a degree of goodness of the match between the document and various categories, and then applies a decision criterion (such as one based on cost of mis-classification) for determining whether the degree of goodness is high enough to assign the document to the category.

Figure 2:
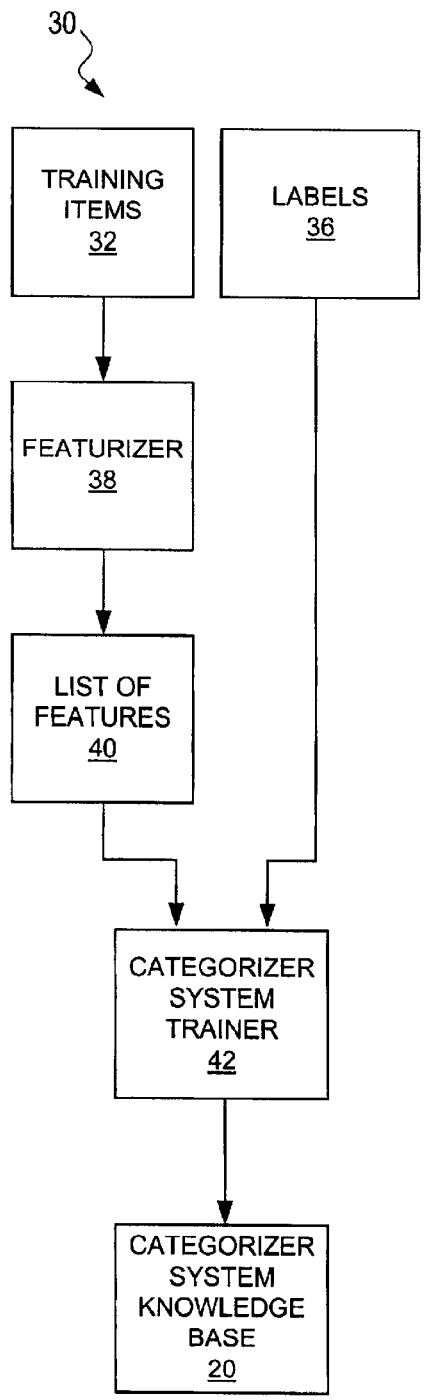
FIG. 2 is a block diagram of the categorization training system in accordance with the present invention.

Referring now to FIG. 2, therein is shown a block diagram of a categorization training system 30 which develops the categorizer system knowledge base 20. The categorization training system 30 starts with a plurality of training items 32, such as documents for which known, correct, topics are available. The human operator needs to only set up a number of labels 36 for the various categories. In the simplest case, each document has a single label 36.

It will be understood also that in the simplest case, the labels 36 are all in the leaves of a hierarchy. The hierarchy is the "tree" of categories which has "branches" which end at "leaves". The leaves are the places in the hierarchy where there are no further subdivisions under a given category. However, one feature in the present invention is that the labels may be placed anywhere in the hierarchy and not just at the leaves.

The plurality of training items 32 are sent to a featurizer 38, which can be the same as the featurizer 14 of FIG. 1. The featurizer 38 creates a list of features 40 for each of the training item 32 documents just as raw documents are featurized in the categorization process 10 of FIG. 1.

The list of features 40 are then provided to a categorizer system trainer 42. The categorizer system trainer 42 also receives the labels 36 and determines the relationship between the list of features 40 and the labels 36 to provide to the categorizer system knowledge base 20. In an artificial intelligence computer system, the categorizer system trainer 42 would be an inference engine and the categorizer system knowledge base 20 would be the knowledge base. As would be evident to one skilled in the art, the categorizer system trainer 42 and the categorizer system knowledge base 20 could be implemented as a single unit.

Figure 3:
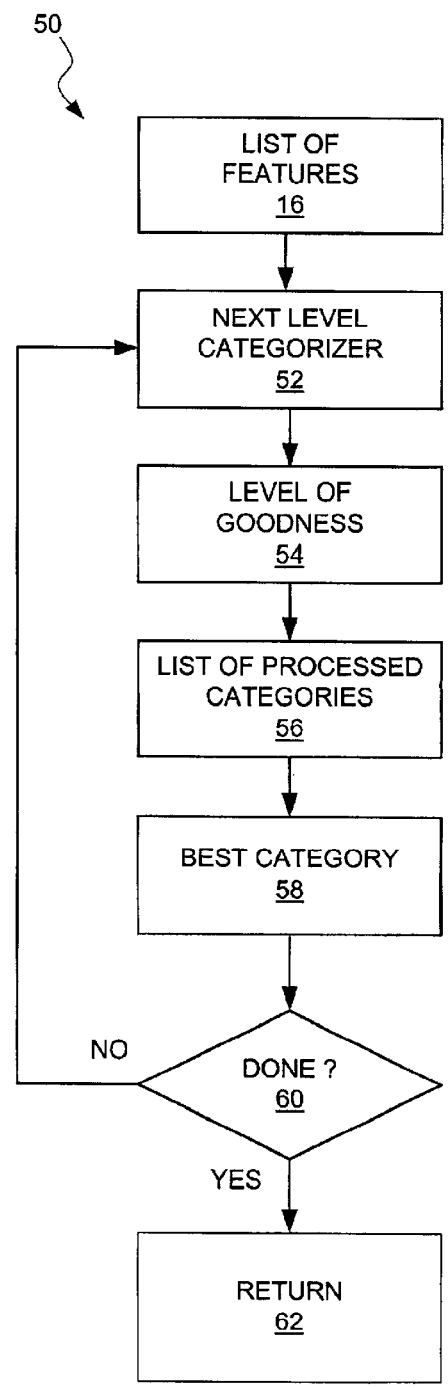
FIG. 3 is a flow-chart of a program for the categorizer system shown in FIG. 1.

Referring now to FIG. 3, therein is shown a flow-chart of a program 50 for the categorizer system 18 of FIG. 1. Starting with the list of features 16 from FIG. 1, the program goes to a next level categorizer 52. In the beginning, the next level categorizer 52 will indicate the top level of the hierarchy so that all possible "next levels" will be below the top level of the hierarchy.

A list of processed categories 56 contains all the categories for which a level of goodness 54 has been determined. Intuitively, the level of goodness 54 of a specific category corresponds to one of two things: if the category has "children" in the tree that have not yet been processed (so these children do not appear on the list of processed categories 56), the level of goodness 54 is the degree to which the list of features 16 of the item support that category or any of its descendants; if the category is a "leaf" (has no children) or if all its children appear on the list of processed categories 56, the level of goodness is the total degree to which the list of features 16 supports only that category (not its children or descendants).

Initially, the list of processed categories 56 contains only the top of the hierarchy, with the level of goodness 54 that is equal to the maximum possible (for example, a value of 1 in the case where probability is used for level of goodness).

First, the version of the method to assign a document to at most one category, including categories internal to the hierarchy, is described.

In the main loop of FIG. 3, the method picks a best category 58 from the list of processed categories 56 (i.e., the category that has the highest level of goodness 54). The DONE test 60 checks if this best category 58 has any children that are not on the list of processed categories 56. If so, the method runs as the next level categorizer 52 the categorizer corresponding to the best category 58. The job of this next level categorizer 52 is to take the level of goodness 54 of the best category 58, and to compute a level of goodness 54 of each of the children of the best category 58, after which each of these children is added to the list of processed categories 56. In addition, the next level categorizer 52 recomputes (updates) the level of goodness 54 of the best category 58 so that this level of goodness 54 now corresponds to the total degree to which the list of features 16 supports only that category (not its children or descendants) before returning the category to the list of processed categories 56.

In the case where the best category is not to be one internal to the hierarchy (i.e., only leaf nodes are to be the final output of the method), then the next level categorizer 52 must set the level of goodness 54 of the (previous) best category 58 to the minimum possible (to guarantee that this category will never again become the best category) before returning the category to the list of processed categories 56.

If the DONE test 60 finds that the best category 58 has no children or that all the children of the best category 58 are already on the list of processed categories 56 (and, since none of them are the best category 58, they must have a lower level of goodness 54 than the best category 58), the method returns the best category 58 as the return 62.

If, based on a decision criterion such as cost of mis-categorization, the level of goodness 54 of the return 62 is sufficiently high, the method assigns the document to that category (the best category 58). If, on the other hand, this level of goodness 54 is insufficient (e.g., below a pre-set threshold), then the method reports that the document does not belong to any category.

Now, the main loop of FIG. 3 is described for the case where a document can belong to multiple categories. In that case, the algorithm is the same, except for the following modifications. First, the best category 58 is the category on the list of processed categories 56 with the greatest level of goodness 54 such that this category has not already been added to the return 62. Second, the DONE test 60 is changed as follows. If the DONE test 60 finds that the best category 58 has no children or that all the children of the best category 58 are already on the list of processed categories 56, then this best category 58 and its level of goodness 54 are added to the return 62 (which, in this case, can include multiple categories and corresponding levels of goodness). After that, if the level of goodness of the best category 58 in the DONE test 60 is sufficiently low, the algorithm goes to the return step 62; if it is not, the algorithm skips the step where the next level categorizer 52 is run and the level of goodness 54 is updated on the list of processed categories 56 (proceeding, instead, directly to the selection of the next best category 58). Finally, the return 62 is processed and for each category that has been added to the return 62, if its corresponding level of goodness 54 is sufficiently high, the method assigns the item to that category. Thus, in this version, the item can belong to multiple categories simultaneously. Also, in this version, the categories with the highest level of goodness 54 are added to the return 62 first, so that if the method is interrupted, the return 62 contains the best partial answer.

This invention is a method that may be used to automatically assign documents to categories within a topic hierarchy. The fundamental concept of the invention is "train locally, categorize globally".

Figure 4:
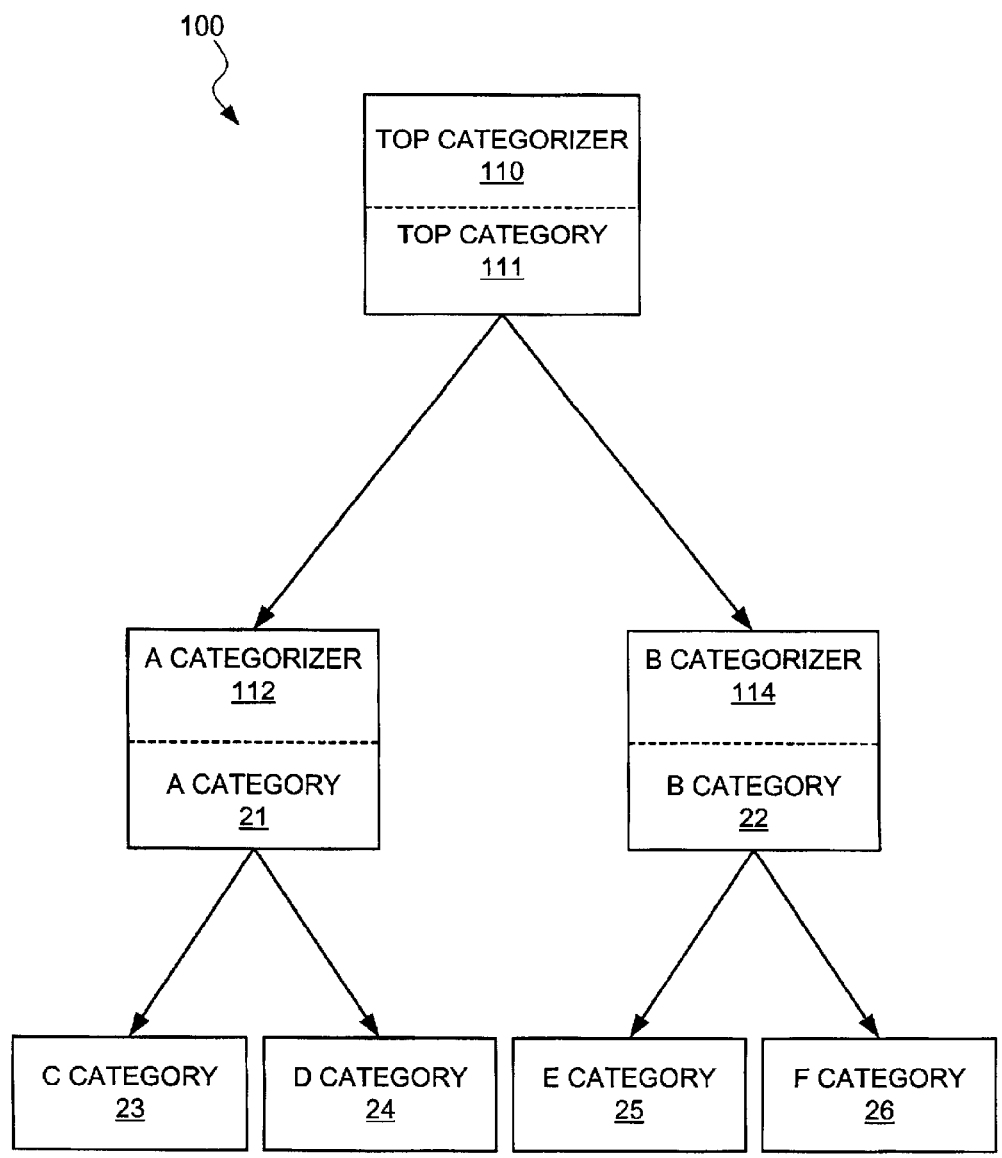
FIG. 4 is a block diagram of a categorization system for documents in accordance with the present invention.

Referring now to FIG. 4, therein is shown a block diagram of a simple categorization system 100 for documents in accordance with the present invention. The simple categorization system 100 has three categorizers: a Top categorizer 110 which includes a top category 111, an A categorizer 112 has the A category 21; and a B categorizer 114 has the B category 22. The simple categorization system 100 may be considered a "tree" having a "root" at the Top categorizer 110 and branches to the A categorizer 112 and the B categorizer 114. At the bottom are "leaves": the C category 23 and the D category 24 connected to the A categorizer 112; and the E category 25 and the F category 26 connected to the B categorizer 114.

Further categorizers would be added at each of the categories for more complex categorization systems and each categorizer would be the beginning of a "subtree" rooted at that categorizer.

In the following explanation brevity, the following notation and terminology is used:

*=categorization of a document to a category (and not one of its leaves), such that A* means a document is categorized in the A category 21.

^=categorization of a document to a subtree root, such that A^ means a document categorized in the A category 21, the C category 23, and the D category 24.

The present invention (a) allows interior documents by adding "categorize document at current category" as one of the options to select from at each level, and (b) instead of ignoring all but the most promising branch at each level, multiple branches are explored, looking for the specific category X* categorization with the highest overall "level of goodness".

As explained, the term "level of goodness" is used to describe how good the fit is between the feature list of the document being categorized and the features of the category. There are many different ways of determining level of goodness, such as Naïve Bayes, quantitative decision-tree classifiers such as C4.5, Bayesian networks, rule-based multi-class classifiers that output some degree of goodness, conditional probability statements, or simple heuristics, among others, or a combination of the aforegoing. It is necessary that the categorizers have to first be able to quantify the level of goodness, second to prioritize the level of goodness, and third to resolve them into a third, weighted, level of goodness.

Using probability as an example of a level of goodness, it may be said that a categorization has a 60% chance of being correct. For ease of understanding, the term "probability" will be used hereafter in place of "level of goodness".

The predictive feature sets used at each category are optimized for the decision at that category, and secondly, the categorizer technology is not restricted to be Naïve Bayes.

The ultimate goal is to determine for a document which categorization is best of Top* vs. A* vs. B* vs. C* vs. D* vs. E* vs. F*.

At each category, the categorizer determines which branch to go down or considers a third alternative of "keep at root" or "keep at sub-root".

Thus, in the above example, a categorizer is trained that would first consider the three alternatives Top* vs. A^ vs. B^. One embodiment of this could, based on some feature selection method, derive the probability of each of these mutually exclusive and exhaustive options. These probabilities could then be used (for example, decision-theoretically in combination with costs of mis-categorization) to definitively select one of the three alternatives. Then, a categorizer for each of the interior categories is recursively developed. Thus, in this example, there are three categorization problems:

1. Top* vs. A^ vs. B^
2. A* vs. C* vs. D*
3. B* vs. E* vs. F*

These are for the Top categorizer 110, the A categorizer 112, and the B categorizer 114, respectively (of course, this generalizes for any number of additional categories, as long as the hierarchy is acyclic).

In building each of these categorizers, the other categorizers or any categories that do not apply to the categorizer can be ignored.

For example, in building the A categorizer 112, any documents or features that are relevant only to F* can be ignored. The advantage of this separation is that the categorizer can be optimized for the categorization problem at hand (and not be weakened by "noise" introduced by a larger space of possible categories or many weak or only partially relevant features).

When categorizing a document, instead of searching myopically, the searching is global, optionally with pruning to reduce computation time. The straightforward method with no pruning is to consider all alternatives, fully exploring the tree. For example, the probabilities of Top*, A^, B^ are calculated based on the Top categorizer 110 and, if they have respective probabilities of 100%, 70%, and 30%, the probability for A^ is then carried down to A categorizer 112. The A categorizer 112 divides up the probability between A*, C*, and D*; e.g., 30%, 40%, and 30%, respectively, of the 70%. The same carry down is performed for B^. Note that $P(A^\wedge)_{Top\ categorizer\ 110} = P(A^* \text{ or } C^* \text{ or } D^*)$ and $P(C^*)_{A\ categorizer\ 112} = P(C|A^\wedge)$, i.e. the probability of categorization to C* is dependent on probabilities into the A categorizer 112 and the B categorizer 114.

One refinement is to categorize in the simple categorizer system 100 in a best-first manner. Thus, the Top categorizer 110 may be used to select the most promising category (based, for example, on utilities of mis-categorization). If a category for which no additional categorizer exists is selected, the categorization is done. If a category for which another categorizer exists (e.g., the A categorizer 112 for A^) is selected, the A categorizer 112 is selected. Next, the results of the A categorizer 112 are merged with the original results from Top categorizer 110, and a decision made as to whether the categorization is done; it is possible to derive probabilities for categorization to any one of Top*, A*, C*, D*, B^. At this point, the decision mechanism (using, for example, cost of mis-categorization) is used. Unless B^ now is the leading contender, the categorization is done. If B^ has the highest probability, categorization is performed by B categorizer 114. After the B categorizer 114, the categorization is done, because the probabilities for each of the possible categorizations have been determined.

Another refinement is for problem instances where documents may not be assigned to interior categories (in this example, Top*, A*, or B*). In this case, the alternatives for the Top categorizer 110 would be A^ vs. B^, for the A categorizer 112 they would be C* or D*, and for the B categorizer 114, they would be E* or F*. The method described above would otherwise apply unchanged.

One generalization is that documents may be assigned to multiple categories. Thus, it may be concluded (based on for example the cost of mis-categorization) that it is warranted to assign a document to C* and also to E*. The method of the present invention would support such a situation easily. The termination rule of the above algorithm can be changed to continue to seek probable categorizations until the remaining categories/subtrees in the priority queue have sufficiently low probability that it is unlikely or impossible that another good categorization would be found.

The categorization decision criteria could then be applied to decide, for each category, whether to assign the document to that category. This method could also be modified to support such a scenario by having, at each category in the graph, a categorizer that is designed to derive the non-exclusive probabilities. Thus, the Top categorizer 110 would be designed to learn probabilities of Top*, A^, and B^, but these probabilities would not have to sum to 1 (for example, the document could be highly likely to be both in Top* and in A^).

The present invention is also applicable where the hierarchy has multiple root nodes (i.e., a forest) or where a node can have multiple parents (a poly-tree). It may also be used in such diverse applications as problem-solving, customer support, marketing support, manufacturing support, sales support, engineering support, Internet website organization, e-services provision, electronic mail; technical knowledge documents; customer profile descriptions; medical records; research papers; abstracts; legal briefs; patent descriptions; etc.; or combinations thereof While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A computer based method for categorization of an item comprising:
providing a plurality of categories organized in a hierarchy of categories;
providing a plurality of categorizers corresponding to the plurality of categories;
featurizing the item to create a list of item features;
using the list of item features in a categorizer system including the plurality of categorizers for determining a plurality of levels of goodness, wherein using the list of item features determines the plurality of levels of goodness using a process to quantify the plurality of levels of goodness, to prioritize the plurality of levels of goodness, and to resolve two levels of goodness into a third level of goodness;
using one of the plurality of levels of goodness for invoking an additional categorizer of the plurality of categorizers as required;
categorizing the item in the categorizer system in the plurality of categories based on the respective plurality of levels of goodness; and
returning the item categorized.

2. The method as claimed in claim 1 including:
using a categorizer system knowledge base for determining the level of goodness for a category with the list of item features.

3. The method as claimed in claim 1 including:
listing the plurality of categories and the respective levels of goodness on a list; and
categorizing from the list.

4. The method as claimed in claim 1 wherein:
returning one category for the item among the plurality of categories selected from a group consisting of the one category with the best level of goodness for all the plurality of categories and with the best level of goodness for which determining is completed where all of the plurality of categories are not compared.

5. The method as claimed in claim 1 wherein:
returning a plurality of categories for the item among the plurality of categories returns a plurality of categories selected from a group consisting of categories up to a fixed number of the plurality of categories, categories having more than a fixed level of goodness, categories fulfilling a user specified preference, categories not from a categorizer, and categories which are a combination thereof.

6. The method as claimed in claim 1 wherein:
returning the category for a plurality of items establishes a categorizer system knowledge base for a topic hierarchy.

7. The method as claimed in claim 1 including:
listing a plurality of labels for each of the plurality of categories; and
training a categorizer system trainer using a plurality of items having known categories and the plurality of labels to provide a categorizer system knowledge base.

8. The method as claimed in claim 1 including:
providing a categorizer system knowledge base;
using a plurality of items with known categories to learn knowledge in the categorizer system knowledge base.

9. The method as claimed in claim 1 including:
providing a categorizer system knowledge base;
providing a plurality of categorizers, each using knowledge in a categorizer system knowledge base and the list of item features to compute a degree of goodness for a plurality of categories, independent of other categorizers, each using a subset of item features to compute a degree of goodness for a plurality of categories, independent of other categorizers, and each subset independent of subsets used by other categorizers; and
providing a mechanism to resolve the levels of goodness for a plurality of categories resulting from multiple categorizers into a combined level of goodness for a plurality of categories.

10. A computer based method for categorization of an item comprising:
  featurizing the item to create a list of item features;
  providing a plurality of categories organized in a hierarchy of categories and having respective lists of category features using a categorizer system knowledge base for determining the lists of category features;
  providing a plurality of categorizers corresponding to one of the plurality of categories, each of the plurality of categorizers using knowledge in the categorizer system knowledge base and the list of item features to compute a degree of goodness for a plurality of categories independent of other categorizers, each of the plurality of categorizers using a subset of item features to compute a degree of goodness for a plurality of categories independent of other categorizers, and each subset independent of subsets used by other categorizers;
  using the list of item features in a categorizer system including the plurality of categorizers with the lists of category features to respectively determine a plurality of levels of goodness, the plurality of levels of goodness determined using a process to quantify the plurality of levels of goodness, to prioritize the plurality of levels of goodness, and to resolve two levels of goodness into a third level of goodness;
  using one of the plurality of levels of goodness for invoking an additional categorizer of the plurality of categorizers as required;
  categorizing the item in the categorizer system in the plurality of categories based on the respective plurality of levels of goodness;
  listing the plurality of categories and the respective levels of goodness on a list;
  returning a category for the item from the list; and
  providing a mechanism to resolve the levels of goodness for a plurality of categories resulting from multiple categorizers into a combined level of goodness for a plurality of categories.

11. A computer based method for categorization of a document comprising:
  providing a plurality of categories organized in a hierarchy of categories;
  providing a plurality of categorizers corresponding to the plurality of categories;
  featurizing the document to create a list of document features;
  using the list of document features in a categorizer system including the plurality of categorizers for determining a plurality of levels of goodness, wherein using the list of item features determines the plurality of levels of goodness using a process to quantify the plurality of levels of goodness, to prioritize the plurality of levels of goodness, and to resolve two levels of goodness into a third level of goodness;
  using one of the plurality of levels of goodness for invoking an additional categorizer of the plurality of categorizers as required;
  categorizing the document in categorizer system in the plurality of categories based on the respective plurality of levels of goodness; and
  returning a category for the document.

12. The method as claimed in claim 11 wherein:
  determining the plurality of levels of goodness includes using a process selected from a group consisting of Naive Bayes, quantitative decision-tree classifiers such as C4.5, Bayesian networks, rule-based multi-class classifiers that output a degree of goodness, conditional probability statements, simple heuristics, and a combination thereof.

13. The method as claimed in claim 11 including:
  using a categorizer system knowledge base for determining the level of goodness for a category with the list of document features.

14. The method as claimed in claim 11 including:
  listing the plurality of categories as the document is compared and the respective levels of goodness on a list; and
  categorizing from the list.

15. The method as claimed in claim 11 wherein:
  returning one category for the document among the plurality of categories selected from a group consisting of the one category with the best level of goodness for all the plurality of categories and with the best level of goodness for which determining is completed where all of the plurality of categories are not compared.

16. The method as claimed in claim 11 wherein:
  returning a plurality of categories for the document among the plurality of categories returns a plurality of categories selected from a group consisting of categories up to a fixed number of the plurality of categories, categories having more than a fixed level of goodness, categories fulfilling a user specified preference, categories not from a categorizer, and categories which are a combination thereof.

17. The method as claimed in claim 11 wherein:
  returning the category for a plurality of documents establishes a categorizer system knowledge base for a topic hierarchy.

18. The method as claimed in claim 11 including:
  listing a plurality of labels for each of the plurality of categories; and
  training a categorizer system trainer using a plurality of documents having known categories and the plurality of labels to provide a categorizer system knowledge base.

19. The method as claimed in claim 11 including:
  providing a categorizer system knowledge base;
  using a plurality of documents with known categories to learn knowledge in the categorizer system knowledge base.

20. The method as claimed in claim 11 including:
  providing a categorizer system knowledge base;
  providing a plurality of categorizers, each using knowledge in a categorizer system knowledge base and the list of document features to compute a degree of goodness for a plurality of categories, independent of other categorizers, each using a subset of document features to compute a degree of goodness for a plurality of categories, independent of other categorizers, and each subset independent of subsets used by other categorizers; and
  providing a mechanism to resolve the levels of goodness for a plurality of categories resulting from multiple categorizers into a combined level of goodness for a plurality of categories.

21. A computer based method for categorization of a document comprising:
  featurizing the document to create a list of document features;

providing a plurality of categories organized in a hierarchy of categories and having respective lists of category features using a categorizer system knowledge base resulting from determining a plurality of documents for determining the lists of category features;

providing a plurality of categorizers corresponding to the plurality of categories, each of the plurality of categorizers using knowledge in the categorizer system knowledge base and the list of document features to compute a degree of goodness for a plurality of categories independent of other categorizers, each of the plurality of categorizers using a subset of document features to compute a degree of goodness for a plurality of categories, independent of other categorizers, and each subset independent of subsets used by other categorizers;

using the list of document features in a categorizer system including the plurality of categorizers with the lists of category features to respectively determine a plurality of levels of goodness;

using one of the plurality of levels of goodness for invoking an additional categorizer of the plurality of categorizers as required;

categorizing the document in categorizer system including the plurality of categorizers in the plurality of categories based on the respective plurality of levels of goodness from the list;

listing the plurality of categories as the document is compared and the respective levels of goodness on a list;

returning a category for the document from the list; and providing a mechanism to resolve the levels of goodness for a plurality of categories resulting from multiple categorizers into a combined level of goodness for a plurality of categories.

22. A computer based system for categorization of an item comprising:

a plurality of categories organized in a hierarchy of categories;

a plurality of categorizers corresponding to the plurality of categories;

a featurizer for featurizing the item to create a list of item features;

a categorizer system including the plurality of categorizers using the list of item features in determining a plurality of levels of goodness, wherein using the list of item features determines the plurality of levels of goodness using a process to quantify the plurality of levels of goodness, to prioritize the plurality of levels of goodness, and to resolve two levels of goodness into a third level of goodness, the categorizer system for categorizing the item in the plurality of categories based on the respective plurality of levels of goodness, the categorizer system for using one of the plurality of levels of goodness for invoking an additional categorizer as required; and a return for returning the item categorized.

23. The system as claimed in claim 22 wherein:

determining the plurality of levels of goodness includes using a process to quantify the plurality of levels of goodness, to prioritize the plurality of levels of goodness, and to resolve two levels of goodness into a third level of goodness.

24. The system as claimed in claim 22 including:

a categorizer system knowledge base for determining the level of goodness for a category with the list of item features.

25. The system as claimed in claim 22 including:

a categorizer system trainer trained using a plurality of items having known categories and the plurality of labels to provide a categorizer system knowledge base.

26. A computer based system for categorization of an item comprising:

a categorizer system knowledge base having a plurality of categories organized in a hierarchy of categories and having respective lists of category features;

a featurizer for featurizing the item to create a list of item features;

a categorizer system connected to the categorization system knowledge base including:

a plurality of categorizers having one of the plurality of categories, the plurality of categorizers for using the list of item features with the lists of category features and knowledge in the categorizer system knowledge base to respectively determine a plurality of levels of goodness using a process to quantify the plurality of levels of goodness, prioritize the plurality of levels of goodness, and to resolve two levels of goodness into a third level of goodness, the plurality of categorizers categorizing the item in the categorizer system in the plurality of categories based on the respective plurality of levels of goodness;

a mechanism for using one of the plurality of levels of goodness for invoking an additional categorizer of the plurality of categorizers as required; and a return for returning the item categorized.

27. The system as claimed in claim 26 wherein:

the plurality of categorizers determine the plurality of levels of goodness using a process to quantify the plurality of levels of goodness, to prioritize the plurality of levels of goodness, and to resolve two levels of goodness into a third level of goodness.

28. The system as claimed in claim 26 wherein:

the categorizer system knowledge base determines the lists of category features.

29. The system as claimed in claim 26 wherein:

the plurality of categorizers include a list mechanism for listing the plurality of categories and the respective levels of goodness; and the plurality of categorizers categorizes from the list mechanism.

30. The system as claimed in claim 26 wherein:

the return returns one category for the item among the plurality of categories elected from a group consisting of the one category with the best level of goodness for all the plurality of categories and with the best level of goodness for which determining is completed where all of the plurality of categories are not compared.

31. The system as claimed in claim 26 wherein:

the return returns a plurality of categories for the item among the plurality of categories returns a plurality of categories selected from a group consisting of categories up to a fixed number of the plurality of categories, categories having more than a fixed level of goodness, categories fulfilling a user specified preference, categories not from a categorizer, and categories which are a combination thereof.

32. The system as claimed in claim 26 wherein:

the return returns the category for a plurality of items to the categorizer system knowledge base for building a topic hierarchy.

33. The system as claimed in claim 26 including:
a further listing mechanism for listing a plurality of labels for each of the plurality of categories; and
a categorizer system trainer trained using a plurality of items having known categories and the plurality of labels to provide the categorizer system knowledge base.

34. A computer based system for categorization of an item comprising:
a categorizer system knowledge base having a plurality of categories organized in a hierarchy of categories and having respective lists of category features;
a featurizer for featurizing the item to create a list of item features; and
a categorizer system connected to the categorizer system knowledge base including:
a plurality of categorizers having the plurality of categories, the plurality of categorizers for determining the list of item features with the lists of category features and knowledge in the categorizer system knowledge base to respectively determine a plurality of levels of goodness using a process to quantify the plurality of levels of goodness, prioritize the plurality of levels of goodness, and to resolve two levels of goodness into a third level of goodness, the plurality of categorizers categorizing the item in the categorizer system in the plurality of categories based on the respective plurality of levels of goodness;
a mechanism for using one of the plurality of levels of goodness for invoking an additional categorizer of the plurality of categorizers as required;
a listing mechanism for listing the plurality of categories and the respective levels of goodness on a list; and
a return for returning a category for the item from the list.

* * * * *